United States Patent [19]

Spariat et al.

[11] Patent Number: 5,115,708
[45] Date of Patent: May 26, 1992

[54] DEVICE FOR TEMPORARY MECHANICAL ATTACHMENT OF AN OBJECT TO A SUPPORT AND RAPID EJECTION OF THE OBJECT FROM THE SUPPORT

[75] Inventors: Jacques Spariat, Saint Medard en Jalles; Jean-Pierre Aubret, Bordeaux; Michel Barriere, Saint Medard en Jalles, all of France

[73] Assignee: Aerospatiale Societe Nationale Industrielle, Paris, France

[21] Appl. No.: 690,546

[22] Filed: Apr. 23, 1991

[30] Foreign Application Priority Data

Apr. 27, 1990 [FR] France .................. 90 05450

[51] Int. Cl.⁵ ............... F16B 15/10; F42B 15/36; B64G 1/64
[52] U.S. Cl. .................... 89/1.14; 102/378
[58] Field of Search ............ 294/82.29, 82.26; 411/20; 244/137.1; 102/377, 378; 89/1.14

[56] References Cited

U.S. PATENT DOCUMENTS

| | | | |
|---|---|---|---|
| 3,104,521 | 9/1963 | Sawyer et al. | 102/378 |
| 3,119,302 | 1/1964 | Barr | 89/1.14 |
| 3,196,745 | 7/1965 | Sustrich et al. | 102/378 |
| 3,262,351 | 7/1966 | Webb | 102/378 |
| 3,530,759 | 9/1970 | Francis | 102/378 |
| 3,643,545 | 2/1972 | Nahas | 89/1.3 |
| 3,887,150 | 6/1975 | Jakubowski, Jr. | 244/137.4 |
| 3,910,154 | 10/1975 | Gardner | 102/378 |
| 4,002,120 | 1/1977 | Swales et al. | 89/1.14 |
| 4,064,783 | 12/1977 | Ess | 102/378 |
| 4,171,663 | 10/1979 | Day et al. | 102/377 |
| 4,187,759 | 2/1980 | Toy et al. | 102/378 |
| 4,554,905 | 11/1985 | Smyly et al. | 403/3284 |
| 4,625,619 | 12/1986 | Ceniza | 102/378 |
| 4,682,804 | 7/1987 | Palmer et al. | 244/137.4 |
| 4,929,135 | 5/1990 | Delarue et al. | 89/1.14 |
| 4,964,595 | 10/1990 | Nordhaus | 244/137.4 |

FOREIGN PATENT DOCUMENTS

| | | |
|---|---|---|
| 0131073 | 1/1985 | European Pat. Off. . |
| 0296936 | 12/1988 | European Pat. Off. . |
| 0365377 | 4/1990 | European Pat. Off. . |
| 2616856 | 6/1987 | France . |

OTHER PUBLICATIONS

Patent Abstracts of Japan, Toyoda Mach Works, Ltd. vol. 11, No. 188 (M-599) (2635) JP-A-1962 013861.

Primary Examiner—David H. Brown
Attorney, Agent, or Firm—Remy J. VanOphem

[57] ABSTRACT

A mechanisms for temporarily attaching an object to a support, separating and ejecting the object, includes a receptacle adapted to be fixed to the support in which an ejector rod is slidably mounted. The ejector rod has a rear portion acted on by an ejection pressure and a front end bearing against a bearing surface near the center of mass of the object, at the end of an elongate recess into which the ejector rod extends to as far as the bearing surface. The body has an annular end portion which is joined to the body by a fragile coupling. The object is provided with a front central centering area at the bottom of the recess, into which extends, with at most a small clearance, the free end of the ejector rod and a rear end centering area situated near the mouth of the recess, into which extends, with small clearance, a rear centering male portion fastened to the body of the receptacle.

30 Claims, 7 Drawing Sheets

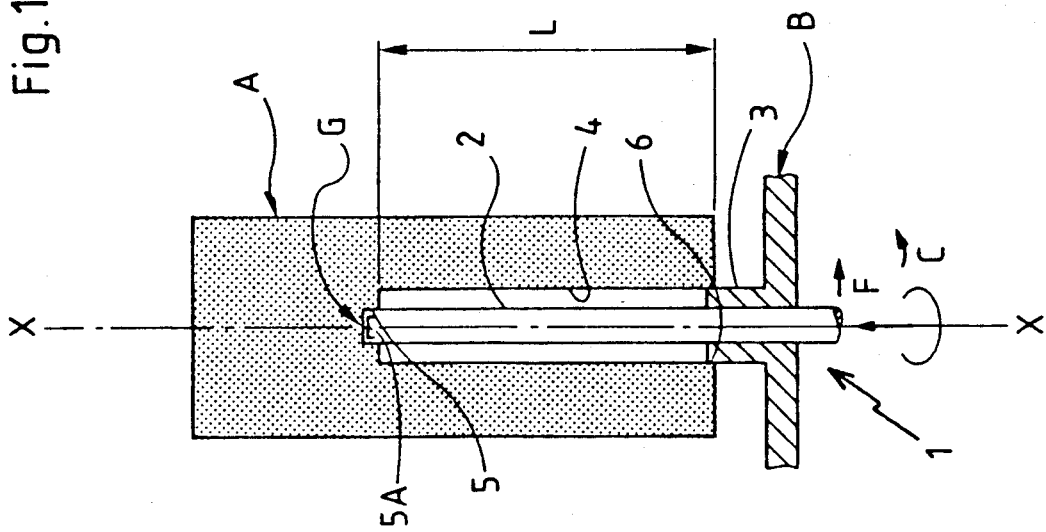
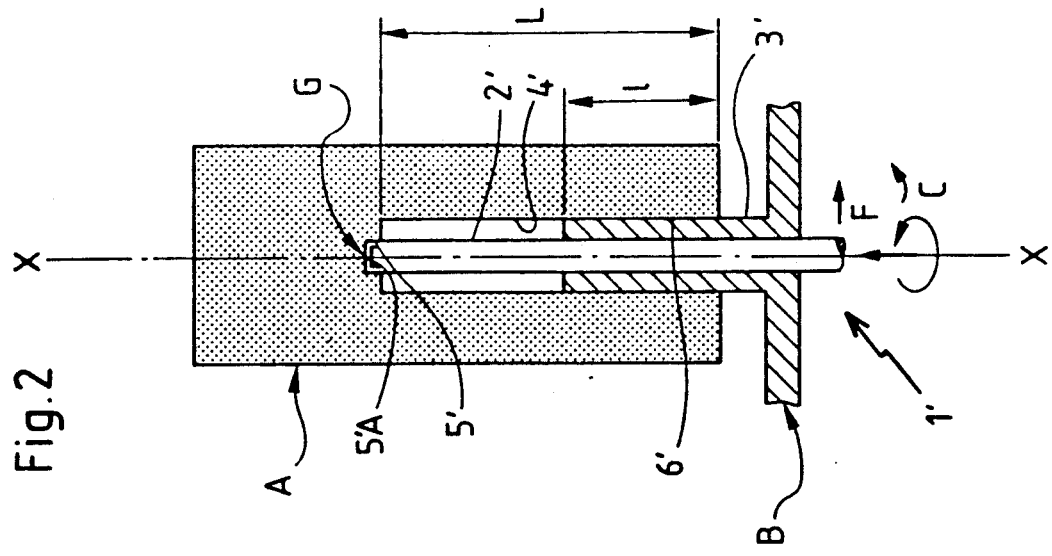

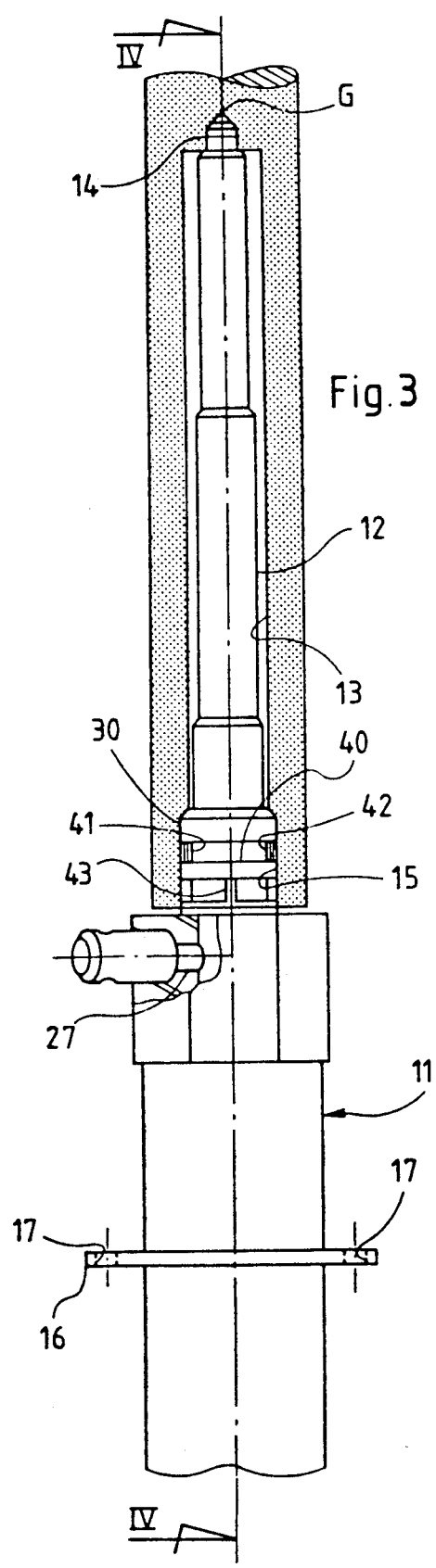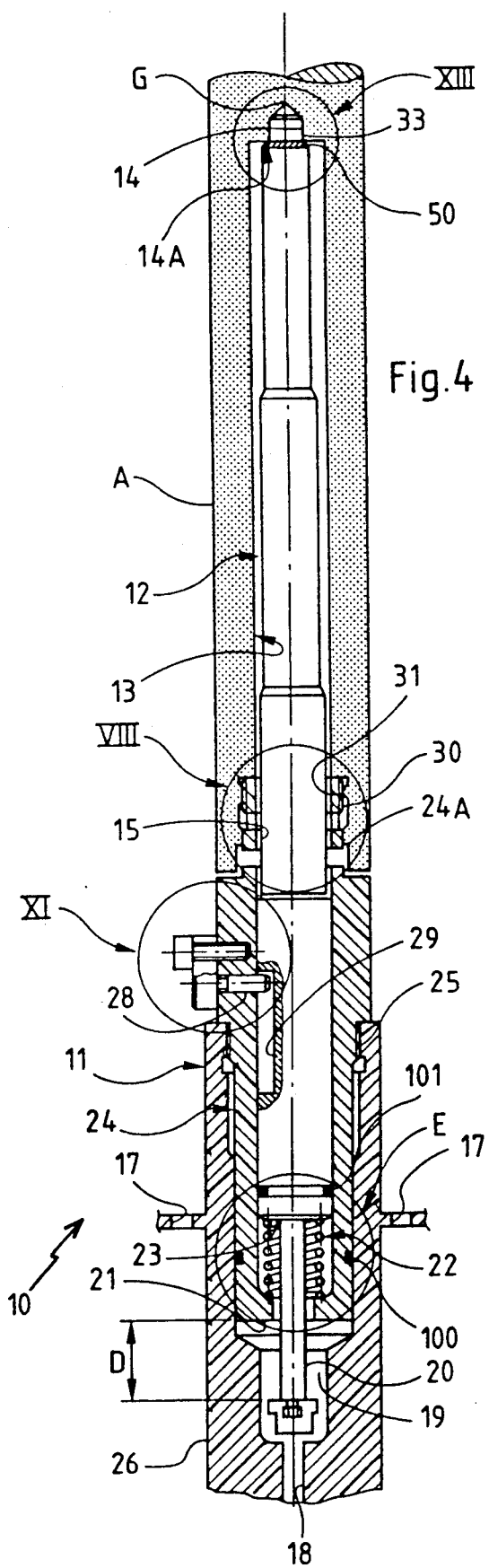

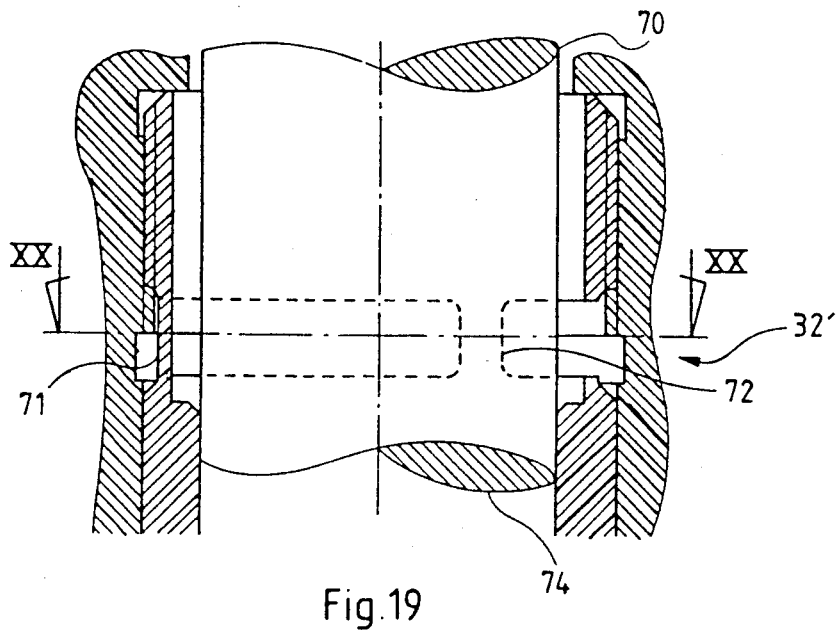
Fig.19
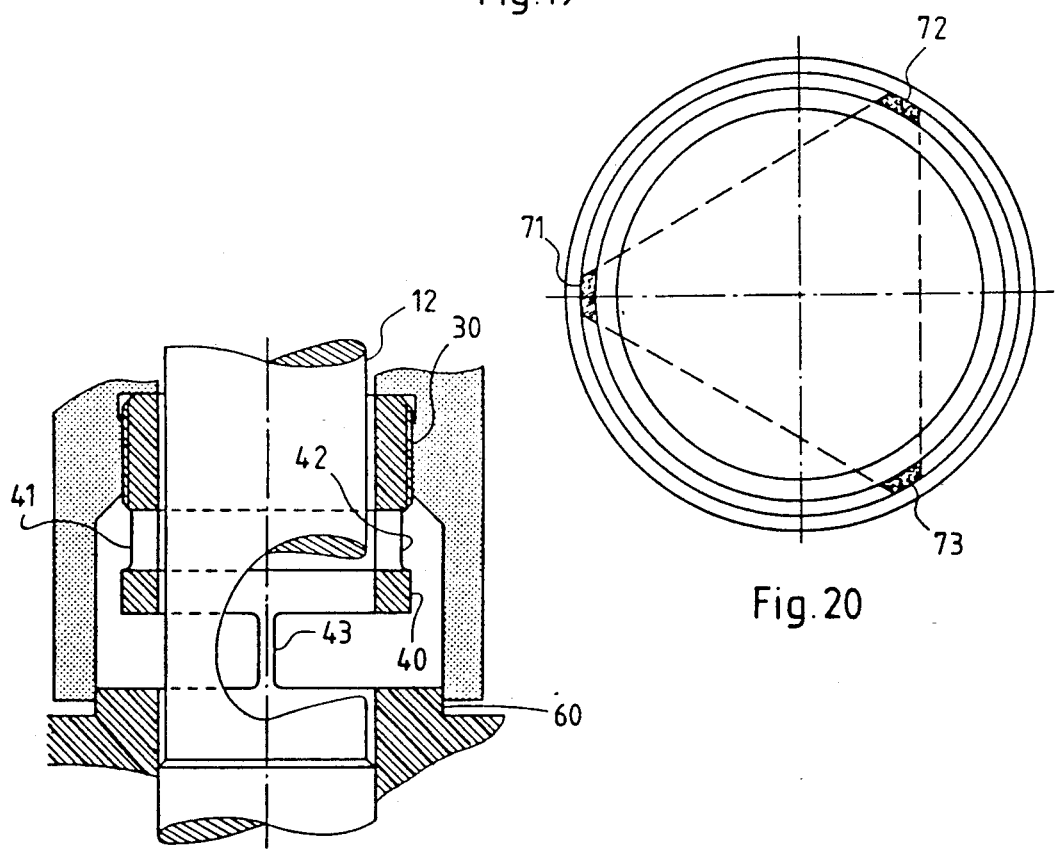
Fig.20
Fig.18

DEVICE FOR TEMPORARY MECHANICAL ATTACHMENT OF AN OBJECT TO A SUPPORT AND RAPID EJECTION OF THE OBJECT FROM THE SUPPORT

BACKGROUND OF THE INVENTION

1. Field of the Description

The invention concerns the temporary attachment of an object to a support, the rapid separation of the object from the support and its ejection with a precisely oriented speed, in particular to launch it without external guidance.

The invention finds an advantageous but by no means exclusive application in spacecraft such as satellites in which separation/ejection operations are needed. It can also find application in various terrestrial vehicles, maritime vehicles (surface vessels and submarines) and airborne vehicles (aircraft of all kind) in which a temporary connection is made that is to be released subsequently, possibly with immediate and precise movement of the object in question, for example to launch it with no external guidance.

A particular application of the invention is in conducting scientific experiments in the upper atmosphere or exploring the planets of the solar system using an automatic probe. For example, it can be used to secure and then release or eject a storage vessel containing a chemical substance to be used as a tracer to study winds or magnetic fields; a storage vessel of this kind can be ejected from an artificial platform such as a sounding rocket or an interplanatory probe.

2. Description of the Prior Art

Various mechanisms are already known for providing temporary attachment of this kind followed by separation and more or less forcible ejection, in practice for achieving clean separation between the object and its support.

The following documents are particularly noteworthy in this respect: U.S. Pat. No. 4,554,905, WO-82/02527, U.S. Pat. No. 3,887,150, U.S. Pat. No. 2,888,294, U.S. Pat. No. 3,196,745, U.S. Pat. No. 3,597,919, U.S. Pat. No. 4,002,120 and U.S. Pat. No. 4,187,759.

In practice these references propose the use of pressure type energy for release or separation. This energy may be pneumatic, hydraulic or pyrotechnic, for example, depending on the application. In the particularly important case of pyrotechnic energy, the pneumatic effects of combusting an explosive substance are used.

Pyrotechnic energy is also used in separator devices of the types including explosive bolts, explosive cutters or pyrotechnic release (unlatching) systems which retract an abutment member. They are usually associated with separator pistons.

Taken as a whole, the various references mentioned above are not concerned with the subsequent movement of the object.

The document FR-2 616 852 is directed to a mechanism for commanding the separation of a member from a support with which it is initially in contact. The ejection speed and acceleration are perfectly controlled. This reference teaches how to apply an accurately defined amount of energy to the object to be ejected to achieve this result.

Finally, the document FR-2 550 756 discloses a mechanism specifically designed to eject aircraft seats.

It has become clear that such mechanisms are incapable of accurately controlling the amplitude and the orientation of the ejection speed, in particular because they do not allow for manufacturing tolerances of the ejector mechanism components or the tolerances for mounting the object to its support.

The device disclosed in the document FR-2 616 852 provides a piston to eject the object by applying thrust to its base. The ejection quality depends significantly on the following parameters:

the stiffness of the parts, in particular the ejector piston and its guide members;

the accuracy with which the guide parts are manufactured and assembled;

the position of the center of mass relative to the thrust axis, with which it may be coaxial, and a main axis of inertia of the member or object to be ejected, especially if rotation about the main axis is to be imparted to the object, as is the case with the present invention; and the quality of implementation of the abutting relationship between the piston and the member to be ejected.

Any eccentricity of the thrust axis relative to the longitudinal axis of the ejector piston, which in practice is aligned as closely as possible with the center of mass of the object, results in the application of a moment to the ejector piston which must be sufficiently stiff and must be guided extremely accurately or it will move (tilt) and impart a transverse velocity to the object.

For the guidance system to be effective it must be able to absorb any moment due to the eccentricity of the thrust axis before the object tilts too far.

Significant unwanted transverse speed can be imparted by even a small tilting movement. It is possible to quantify transverse disturbances (linear and rotational speed) according to the guidance system.

The quality of the end of travel abutment also has a very significant effect on the accuracy of subsequent movement of the object, even with objects having a high transverse inertia. This has been confirmed by experience. If the thrust axis is not accurately perpendicular to the face on the object on which the abutment bears at the end of travel, there occurs at the end of travel a tilting movement of the ejector piston which converts some of its longitudinal kinetic energy into transverse rotational energy. Some of this energy may be imparted to the object and, as already mentioned, an infinitesimal proportion of this energy is sufficient to impart significant transverse speed to the object.

It is found that the quality of the ejection is directly conditioned by the geometrical quality of the ejector and the initial distribution of clearance.

The main consequences are: delicate adjustment, inevitable and significant parameter spread and great difficulty in modeling the ejector (to take into account stiffness, clearance, impact, etc.).

SUMMARY OF THE INVENTION

To overcome the aforementioned drawbacks, the present invention is directed to providing a simple and reliable mechanism combining the three functions of attachment, instantaneous release and ejection at a controlled speed, in which the effects of inevitable uncertainties in the manufacture and the assembly of the parts of the mechanism and of the object relative to the mechanism and to the support are minimized. The three functions are commanded by an appropriate known type energy source (external to the mechanism provided by the invention) adapted to provide an accurate amount of pressure energy.

The primary aim of the present invention is, therefore, to eject an object, member or mass with great accuracy of the resulting movement in the direction of the longitudinal axis of the object, in other words:

given longitudinal velocity $V_L$,
(optionally) given longitudinal rotation speed $W_R$,
minimal transverse rotation (tilt) speed.

The attachment function consists in assembling and mechanically attaching the object to its support even under severe environment conditions, particularly vibration and in some instances the vacuum of space. The relative positioning of the two parts must be highly accurate and this must be achieved in combination with a simple coupling ensuring reliability of operation and implementation.

The result to be achieved for the release function is instantaneous uncoupling of the two parts without disturbing the ejection phase.

The fast ejector device must impart a given acceleration to the object to be ejected by means of a thrust force generating, at the end of ejection proper (at the nominal values), only a given longitudinal velocity $V_L$ optionally associated with a given longitudinal rotation speed $W_R$.

Also, the ejected object must not vibrate in bending during ejection. The ejector mechanism must not apply any unwanted friction or binding forces to the object to be ejected. Further, the exterior of the ejected object must not be damaged during ejection.

In some applications the ejector device must allow ballistic deployment of the object on a predetermined trajectory from the support vehicle. When this movement is governed by gravity only, it is of the EULER-POINSOT type. Ejection must, therefore, initiate movement of the ejected object with characteristics $V_L$, $W_R$ enabling it to follow a given ballistic trajectory, with a nominal or very low transverse rotation speed (or minimal Poinsot cone angle).

To achieve the aforementioned result, the invention teaches application of the thrust as close as possible to the center of mass of the object to be ejected by means of a thrust rod which is in practice longer than the prior art ejector pistons. The advantages of this include increased accuracy of centering and reduced unwanted transverse rotation speed due to manufacturing tolerances and assembly clearances.

As has already been explained, the various disturbances inherent to any ejector mechanism give rise to transverse rotation speeds as the result of a lever arm effect if their point of application is far from the center of mass. The invention minimizes the potential lever arm; therefore, the effects of these disturbances are minimized and the remaining effects are essentially converted into transverse linear movement and not transverse rotation.

The ejection force F applied to the object to be ejected is characterized as follows. Its direction is determined by the guidance function of the ejector mechanism; its intensity is determined by the thrust due to the piston; and its point of application is at the center of mass of the object to be ejected.

To be more precise, the invention proposes a mechanism for temporarily attaching an object to a support, separating and then ejecting the object. A receptacle adapted to be fixed to the support is provided and an ejector rod is mounted in the receptacle and slides in a predetermined direction. The ejector rod has a rear portion acted on by the pressure in a pressure chamber of the receptacle adapted to be placed in communication with a pressure source and a front end bearing in the predetermined direction against a bearing surface provided on the object.

The bearing surface is provided near the center of mass of the object at the bottom of an elongate recess formed in the object, coaxially with the predetermined direction, and into which the ejector rod extends as far as the bearing surface.

The receptacle has a front annular end portion fixed to the object near the mouth of the recess and joined to the body of the receptacle by a fragile coupling.

A front centering central area is formed in the object at the bottom of the recess into which the free end of the ejector rod extends with at most a small clearance. A rear end centering area is also formed in the object near the mouth of the recess into which extends, with small clearance, a rear centering male portion fastened to the body of the receptacle.

According to preferred features of the invention, at least some of which may be combined, the fragile coupling between the front annular end portion of the receptacle fixed to the object and the body of the receptacle has an intermediate ring joined to the annular end area and to the body of the receptacle by two pairs of flexible axial tangs on respective diameters offset angularly by 90°, the tangs in each pair being identical. The tangs of each pair have the same tensile strength and the tangs of one pair have a lower tensile strength than the tangs of the other pair. The tangs of each pair further have the same tensile strength and the tangs joining the intermediate ring to the front annular end area have a lower tensile strength than the tangs joining the intermediate ring to the body of the receptacle. The tangs of the two pairs have dimensions such that they have the same behavior in bending for equal transverse displacements of the free end of the ejector rod in perpendicular radial directions, and the tangs in each pair have the same bending characteristics about their respective diameters, and have the same thickness measured transversely to their respective diameters and the same height measured parallel to the predetermined direction. The tangs of each pair have the same radial dimension and the tangs of one pair have a smaller radial dimension than the tangs of the other pair. The intermediate ring and the tangs are integral parts of at least one part of the body of the receptacle which includes the front annular end portion.

The fragile coupling has three identical tangs designed to fracture which are offset angularly by 120° joining the front annular end portion to the body of the receptacle.

The fragile coupling further includes a spring member compressed axially between a flange on the interior of the receptacle and a bearing surface at the base of the ejector rod to stress the fragile coupling in tension.

The front annular end portion of the receptacle has an externally screwthreaded portion cooperating with an internal screwthread at the mouth of the recess in the object. A rotation guide peg passes through the wall of the receptacle into an approximately longitudinal groove in the ejector rod with a non-zero inclination angle relative to the predetermined direction. A centering peg provided at the free end of the ejector rod enters the front centering central area at the bottom of the recess in the object and projects relative to an annular bearing surface which bears against the bearing area at the bottom of the recess. The ejector rod further has a flexible material member disposed between the end of the ejector rod and the bearing area at the bottom of the recess, the member being a washer surrounding a centering peg projecting relative to an annular bearing surface at the end of the ejector rod. The washer is an O-ring and the bearing area at the bottom of the recess, which lies along a main axis of inertia of the object and along a longitudinal axis of geometrical symmetry of the object, is frustoconical.

The front central centering area has an axial dimension less than or equal to its inside diameter and the rear end centering area has an axial dimension less than or equal to 50% of its inside diameter.

Objects, characteristics and advantages of the invention will emerge from the following description given by way of non-limiting example with reference to the drawings appended hereto.

BRIEF DESCRIPTION OF THE DRAWINGS

FIG. 1 is a diagram showing a mechanism in accordance with the invention for temporarily attaching an object to a support, rapidly separating it therefrom and ejecting it therefrom;

FIG. 2 shows an alternative embodiment of the mechanism depicted in FIG. 1;

FIG. 3 is a view in elevation and partially in axial cross-section of a mechanism as shown diagrammatically in FIG. 1;

FIG. 4 is an axial cross-sectional view taken on line IV—IV in FIG. 3;

FIG. 18 is a partial view in cross-section similar to FIG. 8 and showing a preferred embodiment of the centering arrangement;

FIG. 19 is an axial view of the detail associated with area XIX of FIG. 6 showing an alternative embodiment of the fragile coupling area with no flexibility; and FIG. 20 is a view in transverse cross-section taken along line XX—XX in FIG. 19.

DETAILED DESCRIPTION OF THE PREFERRED EMBODIMENT

Figure 5:
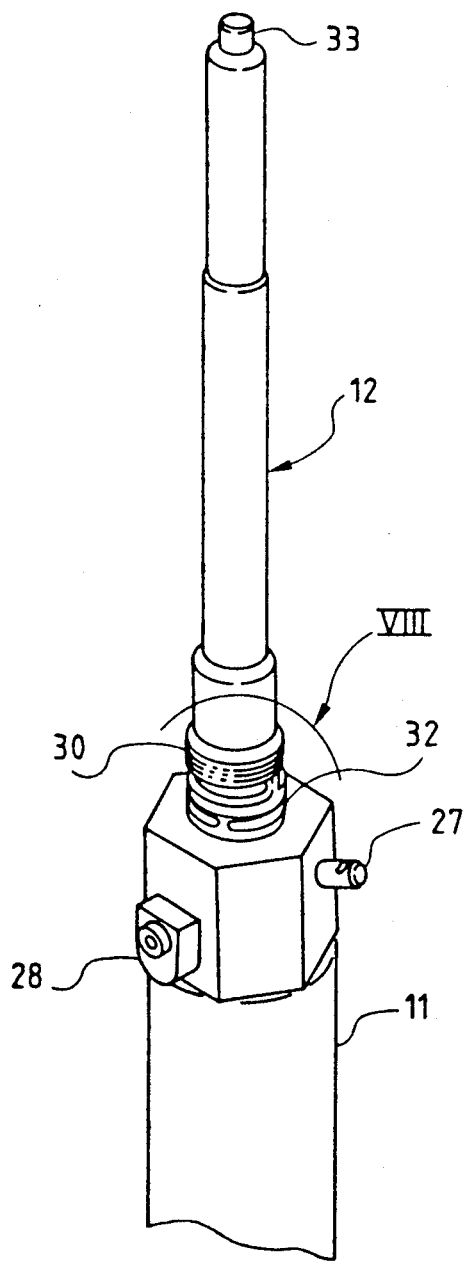
FIG. 5 is a perspective view of the mechanism according to the invention.

FIGS. 1 and 2 are simplified diagrams showing two ejector mechanisms 1 and 1' adapted to accurately eject an object A initially attached to a support B by means which are not shown here to make the diagram clearer but which will be explained later.

Both ejector mechanisms 1 and 1' include an ejector rod 2 or 2' sliding in a guide sleeve 3 or 3' attached to the support B and extending as far as the center of mass G of the object A through an elongate recess 4 or 4' provided in the object A for this purpose.

In the example shown, the center of mass G of the object is shown offset in the axial direction from the center of the rectangle representing the object A: this is because the latter is often of heterogeneous construction.

The longitudinal axis of the ejector rod is preferably coincident with a main axis of inertia X—X of the object A, in this instance a longitudinal axis of symmetry of the latter.

The object A is centered at two axially offset locations, one in the immediate vicinity of the center of the mass G, where a central centering area or portion 5 or 5' of the recess with a small axial dimension surrounds with small clearance the end of the ejector rod, and the other where an end area 6 or 6' of the recess surrounds with small clearance the guide sleeve 3 or 3'. There is provided at the bottom of the recess in the immediate vicinity of the center of mass a generally transverse area 5A or 5'A against which the free end of the ejector rod bears.

In FIG. 1, which represents one preferred embodiment of the invention, the axial distance over which the centering area 6 surrounds the guide sleeve 3 with small clearance is very short, in the order of a few percent of the depth L of the recess which is the axial distance between the areas 5 and 6 in FIG. 1.

In FIG. 2, on the other hand, the sleeve 3' extends further into the recess 4, to a distance l which is approximately half the depth L.

The distance l may represent any fraction less than unity of L. However, it has been found preferable to choose a value for l that is as small as possible (for example, less than 50% of the mean transverse dimension of the sleeve 3, in other words its diameter when it is cylindrical). If the ejector rod is not perfectly guided in the sleeve 3' and if during its movement the ejector rod was subject to any transverse movement due, for example, to assembly clearances, the fact that the sleeve 3' continues to achieve optimum centering of the base of the object during movement imparts a non-negligible tilting speed of the object. On the other hand, if as in FIG. 1 the centering of the base of the object A is eliminated as soon as the ejector rod begins to move, the worst that can happen is transverse displacement of the base without any rotation.

It is found in practice that lengthening the sleeve 3' does not significantly reduce the risk of transverse displacement of the ejector rod and it is then necessary to increase the clearance between the rod and the sleeve to eliminate any risk of binding.

In practice, the invention provides for applying to the object not only a thrust F but also a rotational torque C, which is why the recess 4 or 4' and the outside surface of the guide sleeve, at least where it faces the end centering area 6 or 6', are cylindrical. If the rotation movememt is imparted by the rod itself, it may be made cylindrical, possibly ending with a polygonal cross-section end part, the central centering area 5 or 5' having the same cross-sectional shape. Alternatively, this end part and the central centering area may also be cylindrical, the torque being transmitted to the object by any appropriate means, possibly by simple friction between the end part and the central guiding area.

FIGS. 3 through 5 show one embodiment of a mechanism embodying the general principles of FIG. 1.

The mechanism 10 (so denoted to distinguish it from the highly schematic versions shown in FIG. 1) has a three-fold function: temporary attachment in an accurate position, fast separation and controlled ejection.

The mechanism is primarily composed of a receptacle 11 of generally cylindrical shape (the upper part of which is equivalent to the guide sleeve 3 from FIG. 1), an ejector rod 12 (similar to the rod 2 from FIG. 1), and an elongate recess 13 (similar to the recess 4 in FIG. 1) at the bottom of which are forward central centering area 14 (similar to the centering area 5 in FIG. 1) and a transverse bearing surface 14A. Near its mouth there is provided a rear end centering area 15 (similar to the centering area 6 in FIG. 1).

The receptacle 11 is designed to be mounted to the support B by any appropriate means, for example, by a flange 16 (see FIGS. 3 and 4) with apertures 17 through which fixing bolts can be passed.

At the base of the receptacle is a passage 18 communicating with a pressure chamber of any appropriate known type provided in practice with a pyrotechnic type igniter (to fire a pyrotechnic material). This passage leads to a chamber 19 into which a smaller cross-section rear end 20 of the piston 12 extends.

As shown within the circle E, inside the receptacle is an inwardly projecting flange 21 through which the rear end part 20 of the piston passes and against which a spring member 22, in this instance a coiled spring, bears in the axial direction. The spring also bears in the axial direction against a transverse annular bearing surface 23 at the base of the piston from which the smaller cross-section end 20 projects axially through the spring 22.

The interior flange 21 is part of a liner 24 which is screwed by a screwthread 25 into a tubular exterior end piece 26 which with the liner forms the receptacle 11.

O-ring seals 100 and 101 are provided between the end piece and the liner and between the liner and the base of the ejector rod.

A safety pin 27 (see FIG. 3) projects radially into the wall of the liner 24. When in place and deployed radially into a transverse bore (not shown) in the ejector rod 12, it prevents unwanted movement of the rod. The pin must be retracted radially by any appropriate known means before the object A is ejected.

Figure 12:
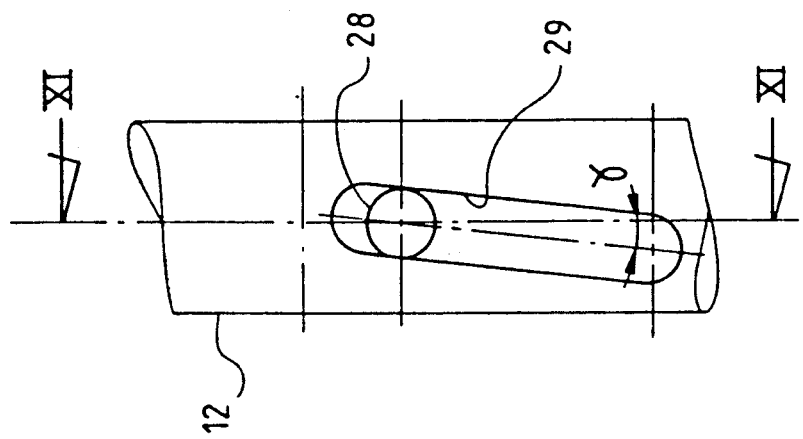
FIG. 12 is a view in elevation without the liner which surrounds the ejector rod.
Figure 11:
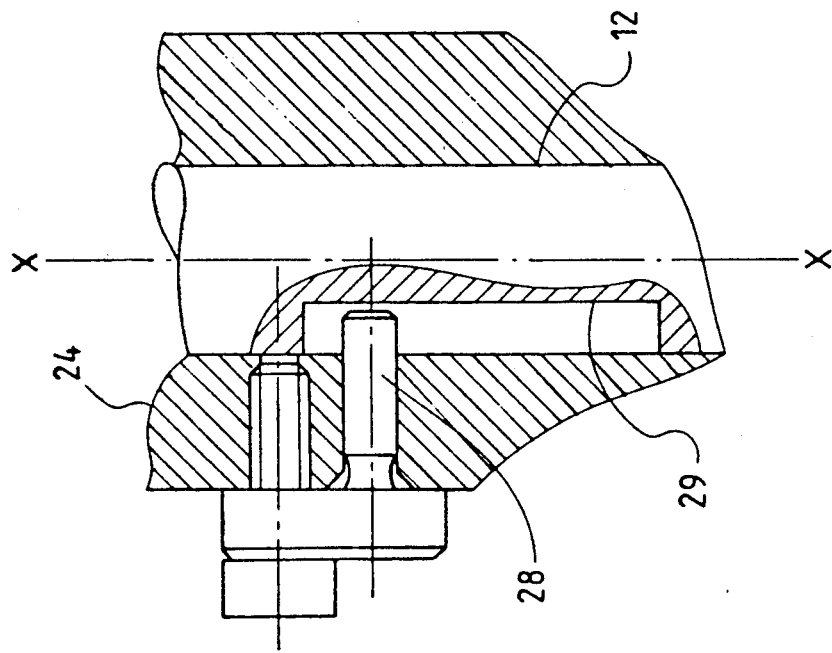
FIG. 11 is a partial view in axial cross-section taken along lines XI—XI in FIG. 12, showing the helical guide subassembly XI from FIG. 4.

As shown also in FIGS. 11 and 12, a rotation guide peg 28 passes through the wall of the liner 24 into an approximately longitudinal straight or helical groove 29 in the piston with a non-null angle of inclination ($\mu$) relative to the longitudinal axis X—X of the ejector rod (see FIG. 12). The axial dimension of the groove is at least equal to the axial travel D of the ejector rod.

The upper part of the liner 24 ends in a smaller cross-section portion 24A terminating at an exterior screwthread 30 designed to cooperate with an interior screwthread 31 at the base of the recess 13.

Figure 7:
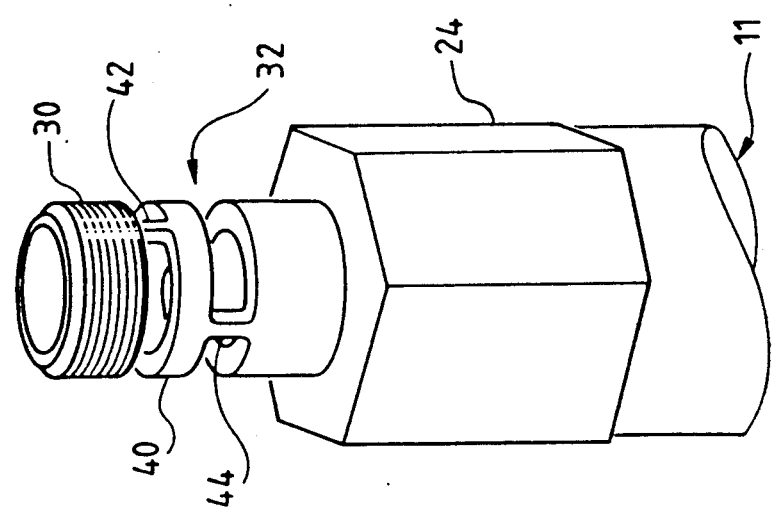
FIG. 7 is a partial view in perspective of the receptacle of the mechanism of FIG. 5 without the ejector rod.

A fragile area 32 is provided between the screwthreaded portion 30 and the remainder of the liner which with the end piece 26 forms the body of the receptacle. The fragile area will be described in more detail with reference to FIGS. 7 and 10.

The ejector rod is composed of a number of sections of reducing diameter, the last of which is a peg 33 fitting with small clearance into the central centering area 14.

Figure 6:
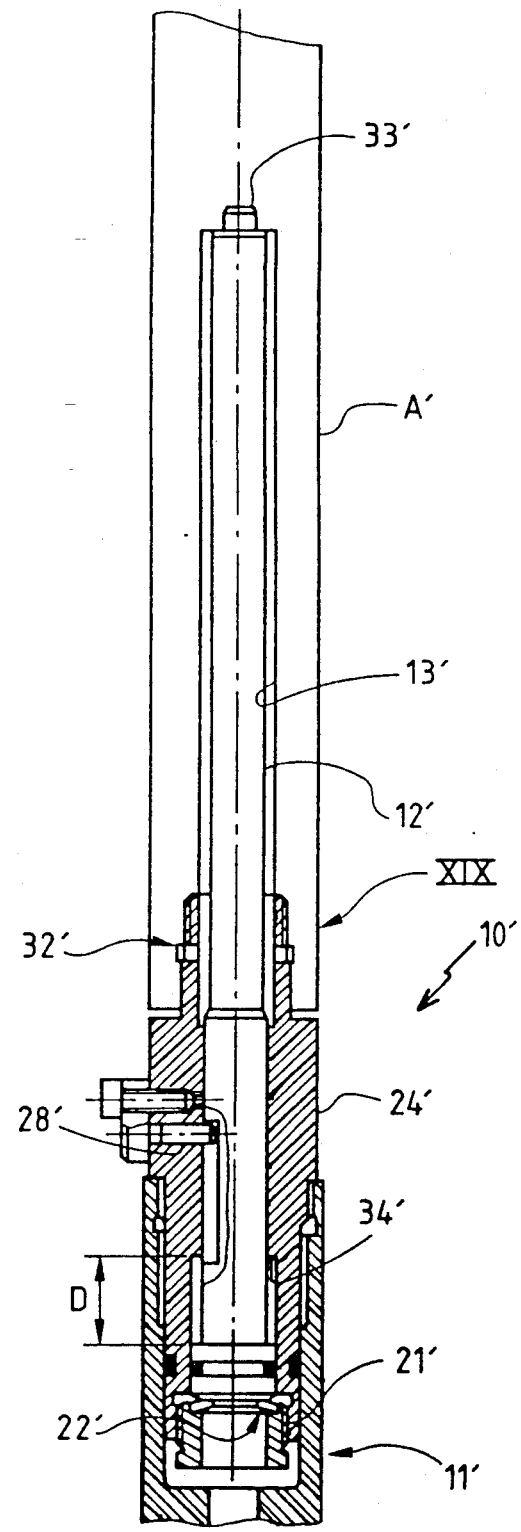
FIG. 6 is a view in axial cross-section of an alternate mechanism in accordance with the invention.

FIG. 6 shows an alternative embodiment of the mechanism from FIG. 4 in which parts similar to those of FIGS. 3 through 5 have the same reference number "primed".

The mechanism 10' differs from the mechanism 10 in that the spring member 22' disposed axially between an annular bearing surface 21' of the liner 24' and the base of the rod 12' is a Belleville washer. The travel D' of the rod is delimited by the annular bearing surface 21' and a shoulder 34' on the liner, the base of the ejector rod having a larger diameter than the rest of the rod. The latter has a smaller number of sections between the base and the end peg 33'. The structure of the fragile area 32', which will be described in more detail with reference to FIGS. 19 and 20, is a simplified version of that of the area 32.

FIGS. 7 through 10 show the fragile area 32 provided below the externally screwthreaded area 30 of the receptacle 11.

The function of this fragile area is entirely to secure the object A longitudinally relative to its support, the stiffness of the ejector rod 12 being sufficient to secure the object against transverse forces.

It is advantageous for this fragile coupling to have low resistance to bending in order to avoid the application of transverse reaction forces to the ejector rod and to avoid tension or compression forces on the parts designed to fracture.

For this reason this portion of the fragile coupling is advantageously designed to be resilient in bending, being a gimbal type device with two transverse rotation axes V—V and W—W at 90° to each other and offset axially relative to each other.

The coupling is formed by an intermediate ring 40 respectively joined to the screwthreaded area 30 joined to the object A and to the remainder of the receptacle joined to the support B by two axially offset pairs of tangs 41 and 42, 43 and 44 which are on respective diameters offset angularly at 90°. These spring tangs are machined from the material of the liner.

The tangs are dimensioned according to the maximum predicted transverse movement of the center of mass of the object before or during ejection. Their height h, parallel to the X—X axis, and their thickness e, perpendicular to the diameters on which they are disposed, are chosen according to the mechanical characteristics of the material from which they are made, so that they absorb such movement without fracturing, and preferably without plastic deformation.

The tangs of the two pairs advantageously have the same behavior in bending (equal bending stresses) for equal transverse displacements of the free end of the rod in two perpendicular radial directions, in practice along the aforementioned diameters.

Those skilled in the art will know how to achieve this condition. If the longitudinal offset between the two pairs of tangs is small in comparison with their distance from the center of mass of the object (as is assumed here), the aforementioned condition is equivalent to stating that the tangs must all have the same bending characteristics, in other words the ratio $e/h^2$ must have the same value for each of them.

In the particularly simple example shown here, the tangs advantageously have the same height h and the same thickness e.

However, to ensure that fracture of the fragile coupling does not impart any spurious moment to the object, the tangs of one pair, for example the tangs 41 and 42 nearest the screwthreaded area, preferably have a radial dimension y which is smaller than the radial dimension y' of the other pair. Despite their identical characteristics in bending, a difference in tensile strength is introduced between the two pairs resulting in fracture of the tangs of one pair only.

Figures 9, 10:
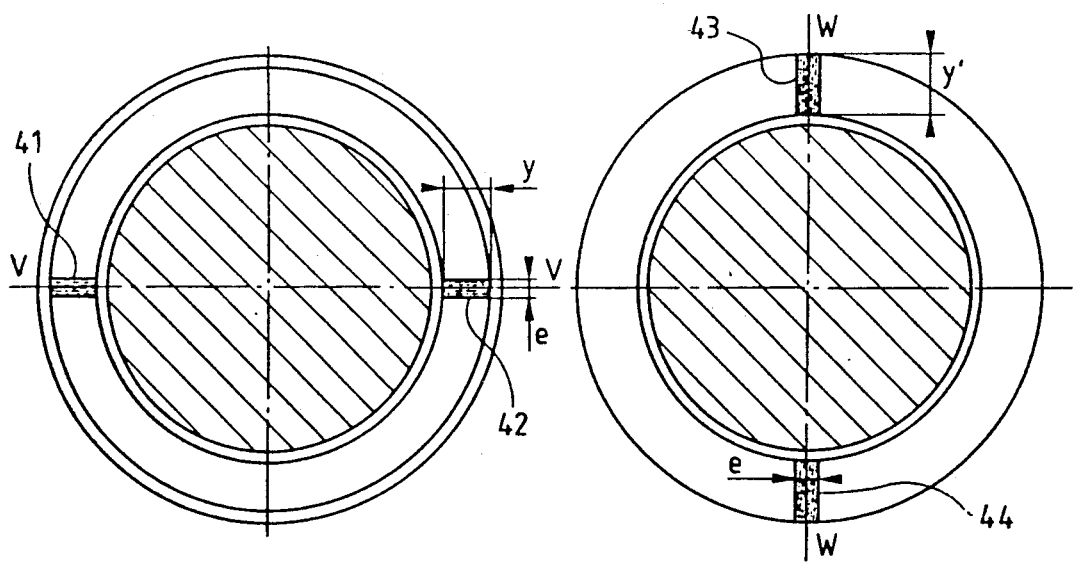
FIGS. 9 and 10 are cross-sections taken along lines IX—IX and X—X, respectively, in FIG. 8.

Referring to FIG. 9, for example, note that the moment of inertia of the pair of tangs 41 and 42 is greater about the W—W axis than the moment of inertia of the same tangs about the V—V axis on which they are aligned. In this way, because the resisting cross-sections of the tangs are offset between FIGS. 4 and 5, the coupling device has approximately the same flexibility in all directions.

The fragile coupling is designed to fracture at a predetermined tension force between the screwthread 30 and the intermediate ring 40.

For the tangs to be operative only in flexion before ejection and to be operative only in traction during ejection and to prevent the screwthreads 30 and 31 from becoming unscrewed, the tangs are prestressed by the spring member 22 which urges the ejector rod against the end of the recess 13 and so loads the tangs.

Figure 8:
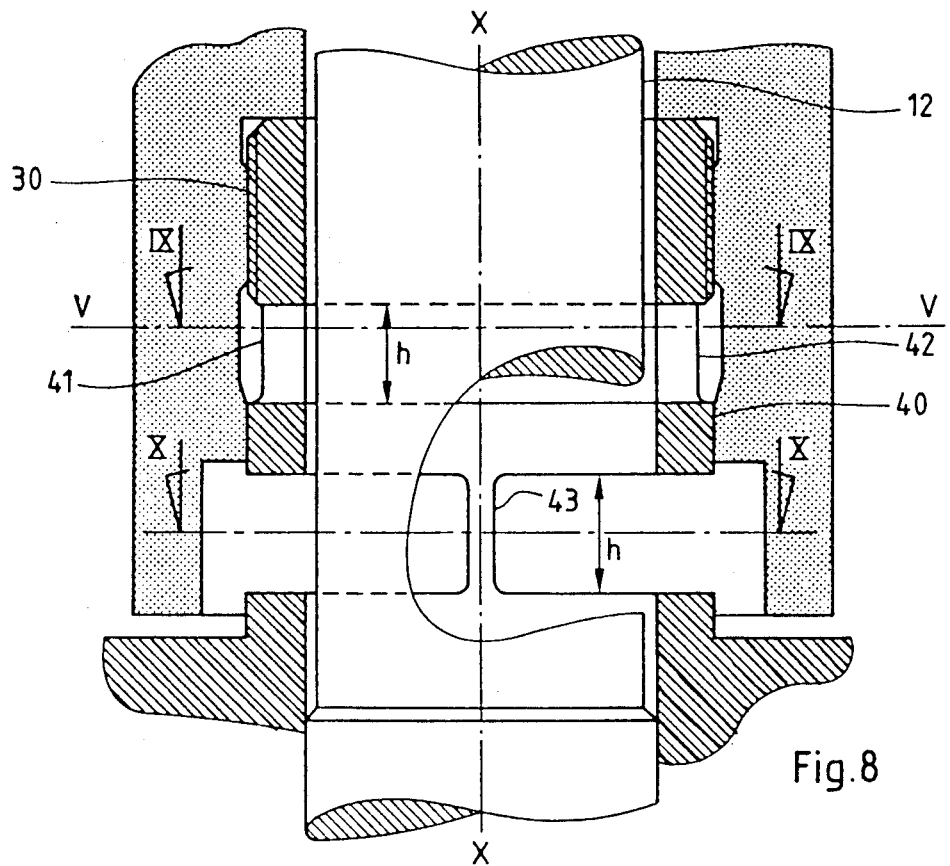
FIG. 8 is an axial cross-sectional view showing the detail of arrow VIII of FIGS. 4 and 5.

In the FIG. 8 example, the rear end centering of the object is provided by the intermediate ring.

FIG. 18 shows a preferred embodiment in which the rear end centering is provided to the rear of the two pairs of tangs by a cylindrical bearing surface 60 on the body of the receptacle and cooperating with an enlarged end of the recess 13. The rear centering, therefore, does not depend on the state of bending of the fragile coupling 32. One advantage of this is to prevent any vibration of the device 10 as a whole and, therefore, of the object during storage (which in practice entails transport) and especially during ejection.

FIGS. 19 and 20 show a simplified version of the fragile coupling which can be used in situations where there is no need for flexibility.

The simplified version has three identical machined tangs 71, 72 and 73 designed to fracture and disposed at 120° to each other, coupling an end area 70 of the receptacle and the remainder 74 of the receptacle. The tangs preferably have a trapezium-shaped cross-section with sides which are coplanar with the sides of the other tangs, as shown by the three dashed lines.

The simplified version, instead of being substituted for the fragile area 32, may be provided between the latter and the end portion (this embodiment is not shown), the tangs 41 through 44 having the same mechanical characteristics in bending and in traction. This provides a bending stage (area 32) and a fragile stage whose functions are effectively decoupled from each other.

To circumvent geometrical errors of centering of the object by the peg 33 and of the in practice inevitable eccentricity of the center of the mass G of the object relative to its geometrical axis X—X, it is advantageous for the distance between the point of application of the thrust and the center of mass of the object to be as small as possible and for this to be achieved automatically.

Figure 13:
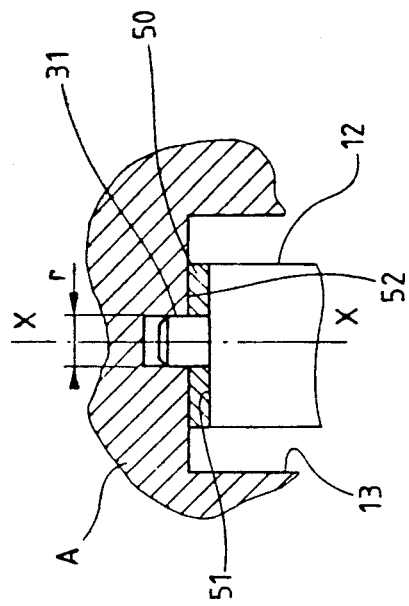
FIG. 13 is an enlarged view of the detail XIII from FIG. 4.

To this end, as shown in FIG. 13, a washer 50 made from a flexible elastomer type material is advantageously disposed axially between a shoulder 51 on the ejector rod near the peg 33 and the transverse bearing surface or shoulder 14A near the central centering area 14. The flexible washer distributes the areas of contact and, therefore, distributes the ejection thrust over the bottom of the recess as close as possible to the center of mass and ensures that the point of application of the infinitesimal forces is near the center of mass. This washer may be an independent separate part or obtained by overmolding.

Figure 14A:
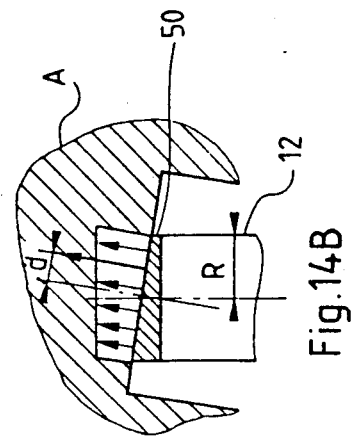
FIGS. 14A and 14B show the thrust forces respectively applied with and without a flexible washer for recentering the thrust.
Figure 14B:
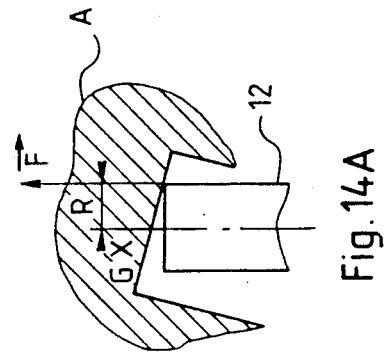

FIG. 14A shows what would happen if no such flexible washer is provided. Because of the stiffness of the peg and of the bottom of the recess (which may be made from steel, aluminum alloy, etc.), the smallest geometrical defect displaces the point of application of the force by the value of the radius R of the ejector rod at this point (FIG. 14A). On the other hand, the flexible washer distributes the forces so that the resultant force is shifted from the center of mass by only a distance d (FIG. 14B) which is very much less than the distance R in the case of a single-point contact at the periphery of the thrust area. Of course, the offsets shown in FIGS. 14A and 14B have been exaggerated to assist with the foregoing explanation.

It will be understood that in practice the thrust force is applied not by the peg itself but by the surrounding shoulder 51 (14A in FIG. 4).

Figure 15:
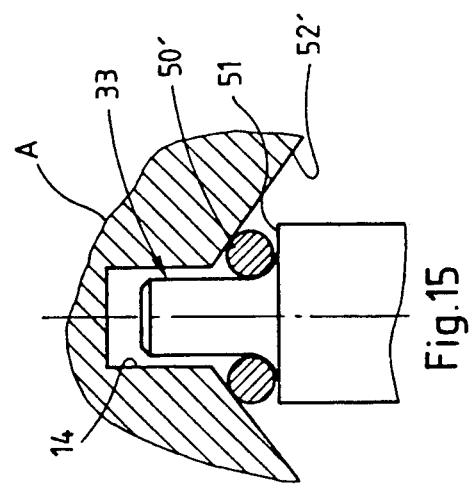
FIG. 15 shows an alternative embodiment of the detail from FIG. 13.

FIG. 15 shows an alternative embodiment with an O-ring 50' between the shoulder 51 and a frustoconical shoulder 52'. This embodiment has the same advantages as a flexible coupling, but also enables rotation of the object resisted by friction. The increased diameter of the bearing surface provides better transmission of torque and the cone increases the adhesion force due to the components into which the thrust forces are divided (the resulting wedging effect favors the driving action).

Figure 16:
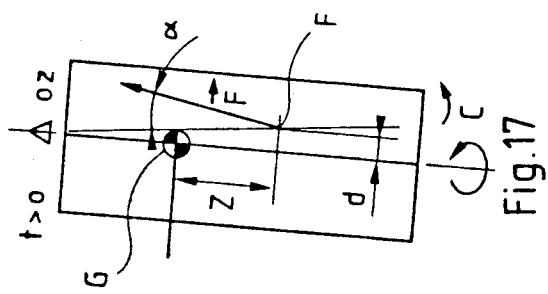
FIGS. 16 and 17 are diagrams showing forces applied to the object A at time t=0 and then during ejection.
Figure 17:
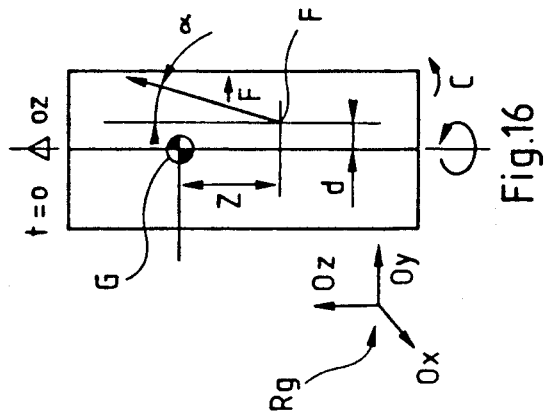

FIGS. 16 and 17 show how the behavior of the object during ejection can be modeled.

The object is assumed to be rigid and is characterized by its mass m and by its principal moments of inertia Ix, Iy, and Iz relative to a frame of reference Rg (Ox, Oy, Oz). FIG. 16 represents the time t=0 and FIG. 17 represents a later time:

For the propelled phase, it is assumed that the point F at which the force F is applied is fixed within the solid material and the influence of three parameters on the transverse speed and the aiming of the object are considered:

d = distance between the center of mass and the center of thrust F in a direction perpendicular to the OZ axis;

z = distance between the center of mass and the center of thrust F along the OZ axis; and α = angle between the vertical OZ axis of the Galilean frame of reference and the direction of the thrust F.

It is further assumed that F and C remain fixed in direction within the Galilean frame of reference Rg throughout the application of the thrust; this assumption being more realistic than assuming F and C are fixed in the object frame of reference.

Finally, it is assumed that the point F is the only point of contact between the rod and the object. The calculation is then totally representative in the case of very short centering contact areas.

In the ballistic phase, only gravity resists the movement, which is a Euler-Poinsot type movement. There are no particular restrictions during this phase.

The results of this calculation justify the concept of applying the thrust as close as possible to the center of mass (by making the parameters d and z as small as possible) and the provision of two short centering areas far apart (one at the center of mass and the other at the base) to minimize the value of the parameter α.

For given values of d and α application of the thrust at the center of mass minimizes the transverse speed. Applying the thrust as close as possible to the center of mass, positioning the object by its base and centering the object close to the center of mass makes it possible to minimize the effects of geometrical errors in the ejector and in the object and to minimize the value of d and α.

As explained above, applying the thrust at the center of mass eliminates the effects of any want of perpendicularity between the ejection axis and the end of travel abutment.

For this type of device the thrust interface between the device and the object at the center of mass of the object is crucial with regard to transverse disturbances. Technological solutions which minimize the offset d yield satisfactory test results.

The "ejector mechanism" subassembly is assembled using a jig. The piston is pushed back until the tension spring turns are in contact with each other. The object is then simply screwed onto the subassembly until it reaches the end of the screwthread, without applying any prestressing.

After the position of the object relative to the liner is checked, the piston is released and the spring then prestresses the coupling which also immobilizes it against rotation.

This assembly can be performed either by screwing the object to the ejector mechanism or by screwing the ejector mechanism to the object.

The use of the mechanism in accordance with the invention will now be described.

Ejection is commanded, for example, by firing an igniter. Pressurizing the combustion chamber causes the piston to be urged against the object at the top abutment near the center of mass.

First the top two tangs of the gimbal type fragile coupling are broken and then the object is accelerated.

As soon as it begins to move, the object clears the bottom centering device or intermediate ring 40 with the result that the only interface between it and the support are the support and centering contact areas near its center of mass.

Note that after the fragile coupling fractures the upper part (the screwthreaded portion) remains attached to the object (in practice its mass is small).

During the linear movement of the piston, the rotation guide peg or finger 28 fixed to the liner slides in the helical or straight groove 29 in the latter which causes it to rotate. This rotation of the ejected object is obtained by friction at the piston/object interface.

The shoulder or end of travel abutment 34 stops the movement of the ejector piston. The object is released from its interface with the piston and enters its ballistic phase.

Note that the object/piston combination is such that complete release of the object relative to the piston occurs without contact.

It will be understood that there are two separate functional interfaces between the object and the device: as close as possible to the center of mass of the object, at a thrust and positioning interface constituted by a bearing engagement and a centering engagement, and, at the base of the object, at a retaining and positioning interface constituted by a screwthread and a centering engagement, respectively.

It is clear from the foregoing description that the mechanism 10 proposed above provides for positioning and retention with an object/ejector device coupling able to withstand mechanical stresses by a screwthreaded coupling and a short centering engagement at the rear of the object, a bearing surface and a short centering engagement in the area of the center of mass of the object and longitudinal tensile prestressing between the screwthread and the bearing engagement at the center of mass.

The mechanism 10 also provides for object/ejector separation (unlatching function) by a coupling designed to fracture in traction situated under the screwthreaded coupling (the rupture energy is low); the flexible coupling being designed to fracture at a predetermined tensile load; and transmission of the ejection (pyrotechnic) energy by a piston whose bearing surface is near the center of mass.

During the attachment or storage phase, the object A to be ejected is positioned by two short centering areas and an abutment area. It is latched by a securing member between the ejector rod and the bottom centering area with pretensioning between the securing member and the abutment area.

Also, the support B may include a gimbal type coupling so that the overall resistance to bending is provided only by the ejector rod and the centering area at the center of mass.

In the ejection phase the securing member is eliminated or retracted. The centering area and the abutment area near the center of mass remain operative. The thrust rod which is part of the support B transmits translation and/or rotation movement(s) through the intermediary of the centering area and the abutment area.

It goes without saying that the above description has been given by way of non-limiting example only and that those skilled in the art can put forward numerous variations thereon without departing from the scope of the invention.

What is claimed is:

1. A mechanism for attaching, separating and ejecting an object having an internal elongated recess therein, said mechanism comprising:

a receptacle having a longitudinal axis and a reduced body portion along said longitudinal axis at one end of said receptacle, said receptacle further having a male centering segment complementary with said reduced body portion of said receptacle, said male centering segment of said receptacle being mounted for slidable engagement with one end of said internal elongated recess of said object;

a fragile coupling coaxially disposed with said longitudinal axis and interposed said male centering segment and said object;

an annular end member having one end attached to said fragile coupling and an external diametral surface;

means for mounting said external diametral surface to said internal elongated recess of said object; and an ejector rod slidably mounted to said receptacle in a direction along said longitudinal axis, said ejector rod having one end contiguous said receptacle and an oppositely disposed end extending from said receptacle, said oppositely disposed end of said ejector rod being substantially coaxial with said fragile coupling and said annular end member, said oppositely disposed end of said ejector rod further being mounted for slidable engagement with an oppositely disposed end of said internal elongated recess of said object;

whereby when said object is mounted to said annular end member said male centering segment and said oppositely disposed end of said ejector rod of said receptacle slidably engage said internal elongated recess of said object to guide said object after said fragile coupling is separated and said object is ejected from said receptacle.

2. A mechanism according to claim 1 wherein said fragile coupling comprises three tangs positioned relative to each other so as to be circumferentially offset by approximately 120°, said three tangs securing said annular end member to said receptacle.

3. A mechanism according to claim 1 further comprising biasing means disposed between said receptacle and said one end of said ejector rod.

4. A mechanism according to claim 1 wherein said means for mounting said external diametral surface of said annular end member comprises an externally threaded portion and wherein said one end of said internal elongated recess has an internally threaded portion, said externally threaded portion being threadably engageable with said internally threaded portion so as to secure said object to said receptacle.

5. A mechanism according to claim 1 further comprising a rotation guide peg radially disposed relative to said longitudinal axis and secured to said receptacle and a groove in said ejector rod with a non-zero inclination angle relative to the predetermined direction, said groove being nonparallel to said longitudinal axis, said rotation guide peg slidably engaging said groove.

6. A mechanism according to claim 1 wherein said internal elongated recess is centrally disposed along a main axis of inertia of said object.

7. A mechanism according to claim 1 wherein said internal elongated recess is centrally disposed along a longitudinal axis of geometrical symmetry of said object.

8. A mechanism according to claim 1 wherein said oppositely disposed end of said internal elongated recess has a predetermined inside diameter and further wherein said one end of said internal elongated recess has a second predetermined inside diameter, said axial extent of said oppositely disposed end of said internal elongated recess being no greater than said second predetermined diameter.

9. A mechanism according to claim 1 wherein said oppositely disposed end of said ejector rod comprises a centering peg for slidably engaging said oppositely disposed end of said internal elongated recess of said object; and an annular bearing mounted in said oppositely disposed end of said internal elongated recess for bearing against said oppositely disposed end of said internal elongated recess of said object, said annular bearing being located approximately at the center of gravity of said object.

10. A mechanism according to claim 9 further comprising an elastomeric member disposed about said centering peg of said ejector rod for engagement with said annular bearing of said object, said elastomeric member being located approximately at the center of gravity of said object.

11. A mechanism according to claim 10 wherein said elastomeric member is an annular washer circumscribing said oppositely disposed end of said ejector rod.

12. A mechanism according to claim 11 wherein said washer is an O-ring and wherein said annular bearing is frustoconical 13. A mechanism according to claim 1 wherein said fragile coupling comprises an intermediate ring interposed said annular end member and said receptacle and at least two flexible axial tangs circumferentially spaced apart and extending longitudinally between said annular end member and said intermediate ring, each of said at least two flexible axial tangs having one end attached to said annular end member and an opposite end attached to said intermediate ring.

14. A mechanism according to claim 13 wherein each of said at least two flexible axial tangs have a first predetermined cross-sectional shape whereby when a force is applied by said object at said oppositely disposed end of said ejector rod in a direction transverse to said longitudinal axis the elastic bending characteristics of each said at least two flexible axial tangs will be substantially the same.

15. A mechanism according to claim 13 wherein said intermediate ring and said at least two flexible axial tangs are integrally formed with said receptacle.

16. The mechanism according to claim 13 further comprising:
at least two additional axial tangs circumferentially spaced apart and extending longitudinally between said intermediate ring and said receptacle, each of said at least two additional axial tangs having one end attached to said intermediate ring and an opposite end attached to said receptacle.

17. A mechanism according to claim 16 wherein said at least two axial tangs and said at least two additional axial tangs have substantially equal tensile strength properties.

18. A mechanism according to claim 16 wherein said at least two flexible axial tangs have a lower tensile strength than said at least two additional axial tangs.

19. A mechanism according to claim 16 wherein each of said at least two flexible axial tangs have a first predetermined cross-sectional shape whereby when a force is applied by said object at said oppositely disposed end of said ejector rod in a direction transverse to said longitudinal axis the elastic bending characteristics of each said at least two flexible axial tangs will be substantially the same.

20. A mechanism according to claim 16 wherein each of said at least two flexible axial tangs and said at least two additional axial tangs have a first predetermined cross-sectional shape whereby when a force is applied by said object at said oppositely disposed end of said ejector rod in a direction transverse to said longitudinal axis the elastic bending characteristics of each said at least two flexible axial tangs and said at least two additional axial tangs will be substantially the same.

21. The mechanism according to claim 13 wherein said at least two flexible axial tangs are mounted between said annular end member and said intermediate ring diametrically opposed about a first axis substantially transverse to said longitudinal axis.

22. A mechanism according to claim 21 wherein said diametrically opposed at least two flexible axial tangs have a first predetermined cross-sectional shape such that said at least two flexible axial tangs have substantially similar bending characteristics.

23. A mechanism according to claim 21 wherein said diametrically opposed at least two flexible axial tangs each have substantially equal thicknesses measured transversely to said longitudinal axis and substantially equal heights measured parallel to said longitudinal axis.

24. The mechanism according to claim 21 further comprising:
at least two additional axial tangs circumferentially spaced apart and extending longitudinally between said intermediate ring and said receptacle, each of said at least two additional axial tangs having one end attached to said intermediate ring and an opposite end attached to said receptacle.

25. A mechanism according to claim 24 wherein said diametrically opposed at least two flexible axial tangs and said at least two additional axial tangs have a first predetermined cross-sectional shape such that said at least two flexible axial tangs and said at least two additional axial tangs have substantially similar bending characteristics.

26. A mechanism according to claim 24 wherein said diametrically opposed at least two flexible axial tangs and said at least two additional axial tangs each have substantially equal thicknesses measured transversely to said longitudinal axis and substantially equal heights measured parallel to said longitudinal axis.

27. The device according to claim 24 wherein said at least two additional axial tangs are mounted between said intermediate ring and said receptacle diametrically opposed about a second axis, said second axis being transverse to said longitudinal axis and substantially perpendicular to said first axis.

28. A mechanism according to claim 27 wherein said diametrically opposed at least two additional tangs have a substantially equal radial thickness and said diametrically opposed at least two flexible axial tangs have a smaller radial thickness than said diametrically opposed at least two additional axial tangs.

29. A mechanism according to claim 27 wherein each of said at least two flexible axial tangs have a first predetermined cross-sectional shape whereby when a force is applied by said object at said oppositely disposed end of said ejector rod in a direction transverse to said longitudinal axis the elastic bending characteristics of each said at least two flexible axial tangs will be substantially the same.

30. A mechanism according to claim 27 wherein each of said at least two flexible axial tangs and said at least two additional axial tangs have a first predetermined cross-sectional shape whereby when a force is applied by said object at said oppositely disposed end of said ejector rod in a direction transverse to said longitudinal axis the elastic bending characteristics of each said at least two flexible axial tangs and said at least two additional axial tangs will be substantially the same.

* * * * *

UNITED STATES PATENT AND TRADEMARK OFFICE
CERTIFICATE OF CORRECTION

PATENT NO. : 5,115,708

DATED : May 26, 1992

INVENTOR(S) : Spariat et al

It is certified that error appears in the above-identified patent and that said Letters Patent is hereby corrected as shown below:

Abstract, line 1, delete "mechanisms" and insert ---- mechanism ----.

Column 6, line 54, delete "of" and insert ---- to ----.

Column 6, line 64, delete "F" and insert ---- $\vec{F}$ ----; same line, delete "C" and insert ---- $\vec{C}$ ----.

Column 7, line 26, delete "example," and insert ---- example ----.

Column 10, line 45, delete "F" and insert ---- $\vec{F}$ ----.

Column 10, line 50, delete "F" and insert ---- $\vec{F}$ ----.

Column 10, line 55, delete "F" and insert ---- $\vec{F}$ ----.

Column 10, line 56, delete "F" and insert ---- $\vec{F}$ ----; same line, delete "C" and insert ---- $\vec{C}$ ----.

Column 10, line 59, delete "F" and insert ---- $\vec{F}$ ----; same line, delete "C" and insert ---- $\vec{C}$ ----.

UNITED STATES PATENT AND TRADEMARK OFFICE
CERTIFICATE OF CORRECTION

PATENT NO. : 5,115,708

DATED : May 26, 1992

INVENTOR(S) : Spariat et al

It is certified that error appears in the above-identified patent and that said Letters Patent is hereby corrected as shown below:

Column 14, line 6, delete "frustoconical" and insert ---- frustoconical. ----.

Column 16, line 6, after "additional" insert ---- axial ----.

Signed and Sealed this

Fifth Day of October, 1993

Attest:

BRUCE LEHMAN

Attesting Officer

Commissioner of Patents and Trademarks